Jan. 27, 1942.   W. RUDBACH   2,270,903
METHOD OF TREATING GASES WITH PULVERULENT SUBSTANCES
Filed July 5, 1939
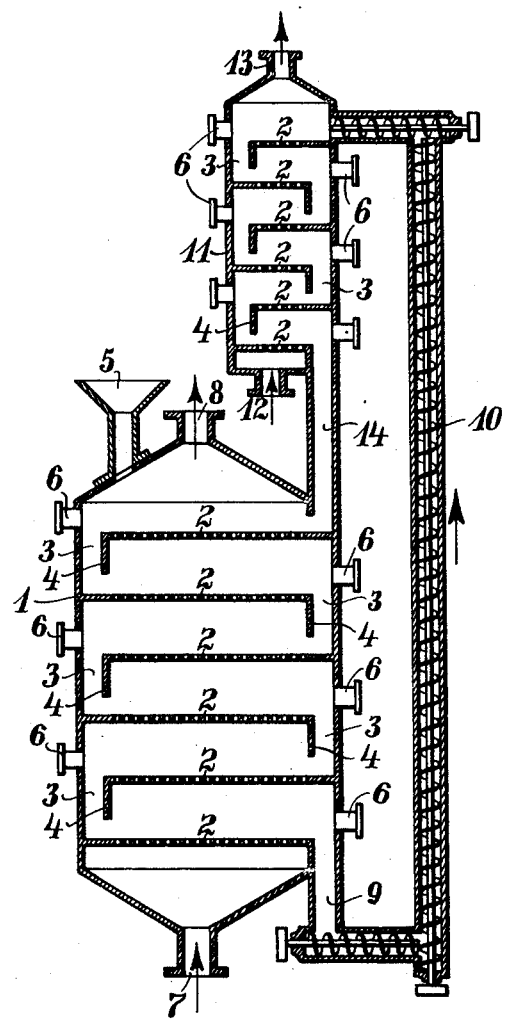
Inventor
Wolfgang Rudbach,
by John B. Brody
Attorney Patented Jan. 27, 1942

2,270,903

UNITED STATES PATENT OFFICE 2,270,903

METHOD OF TREATING GASES WITH PULVERULENT SUBSTANCES

Wolfgang Rudbach, Berlin-Wilmersdorf, Germany, assignor to Bamag-Meguin Aktiengesellschaft, Berlin, Germany Application July 5, 1939, Serial No. 282,867
In Germany July 23, 1938

1 Claim. (Cl. 183—4)

In the known processes for treating gases or vapours with pulverulent substances, care is taken, in order to ensure intimate contact of the substance with the gases under treatment, to employ the substance in a finely divided state for contact with the gas.

To attain this object, mechanical means have been employed, which conveyed the material, disposed in separate layers in superimposed chambers, from one chamber to another.

Since the pulverulent material, which is to be brought into contact with the gas, contains grains of varying sizes, the duration of contact, when the gas is brought into contact with said material while the latter is falling from one stage to another, varies by reason of the different rates of fall of the several grain sizes. There has therefore been no possibility of varying the said duration in accordance with the absorptive capacity, or the speed of treatment. Attempts have also been made to scatter the pulverulent material and bring it, in that condition, into contact with the gas under treatment. In such case also the inconvenience arises that, owing to the irregular size of the pulverulent material and the resulting greater or lesser rate of descent, not all portions of the material come into uniform contact with the gas under treatment.

A further proposal to bring the gas under treatment into intimate contact with the pulverulent material, by providing a rotary drum with interior fittings intended to compel the gas to follow a predetermined course in relation to the material under treatment, is also incapable of bringing all the portions of the material into uniform contact with the gas under treatment, inasmuch as the gas naturally always takes the line of least resistance and does not pass through such portions of the material as collect on the interior fittings to the same extent as it does through the portions beyond said fittings.

All these inconveniences are simply and reliably remedied by the method which the present invention affords.

An object of the invention is to provide a method of treating gases with a pulverulent substance in a plurality of chambers, which method is characterised in that the pulverulent substance encountering the flow of gases is passed over successive perforated screens which are traversed in counterflow by the gases, the pulverulent substance being thereby buoyed into a suspended condition of fluid character, which effects uniform distribution and intimate contact of the gas and the pulverulent material, the depth of the layers of the substance on the screens being adjusted to the duration of the treatment, and the size of the perforations in the screens for the passage of the gas being so related to the grain size and specific gravity of the pulverulent material that the suspension takes place over the whole perforated zone of each screen.

The action of the gas in respect to the pulverulent material is such as to create an agitation of the grains upwardly in the direction of flow of the gas. The adhesion of the grains in the mass of pulverulent material is thus reduced, both by virtue of the agitation of the grains and the buoyant effect of the gas stream, and the mass becomes fluid in character, that is, the mass tends to conform with the shape of the container, to assume a level surface, and to flow like a fluid under hydrostatic principles, while still retaining its pulverulent nature. Under such conditions, the grains are, in the main, in suspension in the gas stream and the surface area of the pulverulent material in contact with the gas is increased to such extent that much more effective and efficient treatment is possible.

The condition into which the onflowing material is brought by encountering the flow of the gas leads to the following results:

In the suspended condition, the pulverulent material spreads in horizontal layers on the screens. The depth of the layers is determined by the distance from the lower edge of a partition, situated in an overflow space, and the next lower screen. Said depth can be adjusted in accordance with the required duration of the treatment by the gas employed, by altering the free space between the screen and the overflow from the next higher screen. It has unexpectedly transpired that the material reaching the screens travels, in horizontal layers thereon, solely as a result of the action of the gas traversing the screens. The rate of travel of the pulverulent material over the screens depends on the amount of material drawn off at the overflow from the lowest screen.

After the reaction has been performed, the pulverulent material is led away for regeneration in known manner by means of conveyors, for example of the worm type. In certain cases, the regeneration is performed under similar conditions to the specific treatment, and the regenerated material is returned to the reaction chamber, thus completing a closed circulation.

It is a special advantage of the present process that, despite the different grain sizes occurring in the pulverulent mass, it is possible, by a suitable choice of the rates of flow, to avoid blowing away the finer portions and, nevertheless, to maintain the true counterflow principle, a result which is difficult to attain in a process where a mechanical method of advancing the material is employed. The transfer of the pulverulent material through one stage after another is effected by the present method in the horizontal direction, and at right angles to the direction of flow of the gas. This affords the advantage that all grain sizes of the pulverulent material under treatment are uniformly exposed to the action of the gas, so that both the large and the small grains are subjected to that action for the same length of time.

A typical embodiment of the apparatus required for carrying out the method is illustrated in the accompanying drawing, which is a diagrammatic vertical sectional view thereof.

A vessel 1, in which the treatment is to be performed, is provided with superimposed perforated screens 2, arranged at a certain distance apart. The screens do not extend all over the cross section of the vessel, but leave a free overflow space 3, the wall 4 of which terminates a certain distance above the next lower screen and constitutes a trap for the substance flowing over from the next higher screen. The pulverulent substance is initially fed from a charging hopper 5 on to the top screen 2. In starting the apparatus, care is to be taken to fill the free overflow spaces 3, in succession, from above downwards, with the pulverulent substance, through branches 6 provided for that purpose, in order to compel the gas which is introduced from below by way of a branch 7 to pass through the perforations in the screens, and not through the overflow spaces 3. The gas passes away through an outlet 8. The flow of the gas through the screens immediately levels out the layers of pulverulent substance situated thereon, which is thus buoyed into a suspended condition with the character of a fluid. The result of this condition is that the pulverulent material adjusts itself on each screen to a layer of uniform depth determined by the distance of the bottom of the wall 4 above the screen, and travels over the screens with a horizontal velocity corresponding to the amount of material drawn off at the bottom screen. The material drawn off at 9 is passed by means of a conveyor, such as a worm 10, into a regenerating vessel 11, located above the treatment vessel.

The vessel 11 is provided, in exactly the same manner as the vessel 1, with screens 2 which, in the example shown, are of smaller dimensions, and also have overflow spaces 3 and walls 4 bounding the latter. In this case also charging branches 6 are provided, for the purpose of initially filling the spaces 3 to compel the gas to flow through the perforations of the screens. The gas employed for the regeneration is admitted at 12 and discharged at 13. The pulverulent substance traversing the regenerating vessel 11 passes, through a discharge branch 14, on to the uppermost screen of the treatment vessel 1.

The method of treatment afforded by the invention is advantageously applicable for effecting the absorption of organic solvents, such as hydrocarbons in the benzine synthesis process, or the recovery of benzine from coke-oven gases, by means of pulverulent active charcoal, and also for drying gases by means of pulverulent silica gel.

I claim:

In the treatment of gases with a pulverulent substance in a plurality of successive chambers, wherein the floor of each chamber is a fixed screen having perforations of predetermined size relative to the grain size and specific gravity of the pulverulent substance, and the successive chambers are connected by vertical passages through the screens, the method of moving the pulverulent substance through the successive chambers which consists in distributing the pulverulent substance over said screens and filling said passages with said substance, passing the gases to be treated upward through the screens and the pulverulent substance thereon with a velocity correlated with the size of the screen perforations, the grain size and specific gravity of the pulverulent substance to agitate said substance and cause it to flow in the manner of a fluid, regulating the rate of discharge of used pulverulent substance from the lowermost chamber and supplying fresh quantities of the pulverulent substance at the same rate to the uppermost chamber, said substance being moved gravitationally in said passages between said chambers and flowing substantially horizontally across each of said screens into the respective passages therethrough to maintain the levels of the substance substantially constant over the several screens and in the several passages.

WOLFGANG RUDBACH.